(12) United States Patent
Liu et al.

(10) Patent No.: US 11,129,239 B2
(45) Date of Patent: Sep. 21, 2021

(54) APPARATUSES AND METHODS FOR IN-DEVICE COEXISTENCE (IDC) INTERFERENCE PREVENTION

(71) Applicant: MEDIATEK INC., Hsinchu (TW)

(72) Inventors: Wei-Lun Liu, Hsinchu (TW);
Sheng-Kai Chang, Hsinchu (TW);
I-Ching Hsieh, Hsinchu (TW);
Yen-Chih Yang, Hsinchu (TW);
Teng-Wei Huang, Hsinchu (TW);
Tzu-Shiang Hsu, Hsinchu (TW);
Tzu-Yu Lee, Hsinchu (TW);
Tsung-Yueh Chiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/798,717

(22) Filed: Feb. 24, 2020

(65) Prior Publication Data

US 2020/0389937 A1 Dec. 10, 2020

Related U.S. Application Data

(60) Provisional application No. 62/857,927, filed on Jun. 6, 2019.

(51) Int. Cl.
*H04W 4/00* (2018.01)
*H04W 88/06* (2009.01)
(Continued)

(52) U.S. Cl.
CPC ............ *H04W 88/06* (2013.01); *H04L 12/66* (2013.01); *H04W 48/16* (2013.01); *H04W 48/18* (2013.01); *H04W 76/27* (2018.02); *H04W 84/18* (2013.01)

(58) Field of Classification Search
CPC ..... H04W 88/06; H04W 76/16; H04W 76/27; H04W 48/18; H04W 48/16; H04W 84/18;
(Continued)

(56) References Cited

U.S. PATENT DOCUMENTS

2013/0143542 A1* 6/2013 Kovvali ............... H04W 88/18
455/418
2013/0273857 A1* 10/2013 Zhang ................ H04L 5/0037
455/73

(Continued)

OTHER PUBLICATIONS

Chinese language office action dated Jan. 15, 2021, issued in application No. TW 109114763.
(Continued)

*Primary Examiner* — Marceau Milord
(74) *Attorney, Agent, or Firm* — McClure, Qualey & Rodack, LLP

(57) ABSTRACT

The wireless communication device includes one or more wireless transceivers and a controller. The one or more wireless transceivers detect(s) one or more first frequency bands of one or more cellular networks, and detect(s) one or more second frequency bands of one or more non-cellular networks. The controller selects one of the first frequency bands and one of the second frequency bands, which do not overlap, and assigns the selected first frequency band to one of the wireless transceivers, thereby enabling one of the wireless transceivers to camp on a cell on the selected first frequency band. Also, the controller assigns the selected second frequency band to one of the wireless transceivers, thereby enabling one of the wireless transceivers to connect to one of the non-cellular networks on the selected second frequency band.

20 Claims, 12 Drawing Sheets

(51) Int. Cl.
*H04L 12/66* (2006.01)
*H04W 76/27* (2018.01)
*H04W 48/18* (2009.01)
*H04W 48/16* (2009.01)
*H04W 84/18* (2009.01)

(58) Field of Classification Search
CPC ..... H04W 24/20; H04W 36/06; H04W 84/12; H04L 12/66
USPC .......................... 370/329, 252, 335, 431, 342
See application file for complete search history.

(56) References Cited

U.S. PATENT DOCUMENTS

| | | | |
|---|---|---|---|
| 2015/0312831 A1 | 10/2015 | Sang et al. | |
| 2016/0050668 A1 | 2/2016 | Cai et al. | |
| 2016/0380791 A1* | 12/2016 | Vishwanathan | H04L 69/18 370/328 |
| 2017/0013513 A1* | 1/2017 | Agarwal | H04W 24/02 |
| 2017/0303180 A1* | 10/2017 | Kapoulas | H04W 36/0094 |
| 2018/0020383 A1 | 1/2018 | Sirotkin et al. | |
| 2018/0092085 A1* | 3/2018 | Shaheen | H04W 36/14 |
| 2018/0184428 A1* | 6/2018 | Cariou | H04W 12/06 |
| 2018/0317232 A1* | 11/2018 | Kumar | H04W 24/10 |
| 2019/0149365 A1* | 5/2019 | Chatterjee | H04L 5/0092 370/329 |
| 2019/0260544 A1* | 8/2019 | Dou | H04W 72/0453 |
| 2020/0021409 A1* | 1/2020 | Kumar | H04W 72/0453 |
| 2020/0107255 A1* | 4/2020 | Cuevas Ramirez | H04W 36/14 |
| 2020/0260463 A1* | 8/2020 | Lovlekar | H04W 72/1215 |

OTHER PUBLICATIONS

"3GPP TS 36.331 V15.5.1; 3rd Generation Partnership Project; Technical Specification Group Radio Access Network; Evolved Universal Terrestrial Radio Access (E-UTRA); Radio Resource Control (RRC); Protocol specification (Release 15);" Apr. 2019; pp. 1-104.

* cited by examiner

APPARATUSES AND METHODS FOR IN-DEVICE COEXISTENCE (IDC) INTERFERENCE PREVENTION

CROSS REFERENCE TO RELATED APPLICATIONS

This application claims priority of U.S. Provisional Application No. 62/857,927, filed on Jun. 6, 2019, the entirety of which is incorporated by reference herein.

BACKGROUND OF THE APPLICATION

Field of the Application

The application generally relates to wireless communications, and more particularly, to apparatuses and methods for In-Device Coexistence (IDC) interference prevention.

Description of the Related Art

With growing demand for ubiquitous computing and networking, various wireless technologies have been developed, including cellular technologies (also called Radio Access Technologies (RATs)) and non-cellular wireless technologies. For example, cellular technologies may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and New Radio (NR) technology, and others. Non-cellular wireless technologies (also called Short Range Wireless (SRW) technologies) may include Wireless-Fidelity (Wi-Fi) technology, Bluetooth (BT) technology, and Zigbee technology, etc.

Nowadays, a wireless communication device, such as a mobile phone, a tablet, an Internet of Things (TOT) device, a telematics device, etc., may support multiple RATs and even support one or more non-cellular technologies, to provide a user the flexibility of wireless communications at all times via the supported wireless technologies, regardless of his/her geographic location. Taking a handheld device (e.g., a mobile phone) equipped with multiple wireless transceivers for example, In-Device Coexistence (IDC) interference is a serious issue due to extreme proximity of the wireless transceivers within the same device. Similar problem also exists in the handheld device equipped with a single wireless transceiver supporting one or more cellular technologies and/or one or more non-cellular technologies.

Therefore, it is desirable to have a robust way of solving the problem of IDC interference in wireless communication devices, especially for those that are small in size.

BRIEF SUMMARY OF THE APPLICATION

In order to solve the aforementioned problem, the present application proposes to collect available frequency bands detected by one or more wireless transceivers within the same device, and select non-overlapping frequency bands for the one or more wireless transceivers to use before the IDC interference occurs.

In one aspect of the application, a wireless communication device comprising one or more wireless transceivers and a controller is provided. The one or more wireless transceivers is/are configured to detect one or more first frequency bands of one or more cellular networks, and detect one or more second frequency bands of one or more non-cellular networks. The controller is configured to select one of the first frequency bands and one of the second frequency bands, which do not overlap, assign the selected first frequency band to one of the wireless transceivers, thereby enabling one of the wireless transceivers to camp on a cell on the selected first frequency band, and assign the selected second frequency band to one of the wireless transceivers, thereby enabling one of the wireless transceivers to connect to one of the non-cellular networks on the selected second frequency band.

In another aspect of the application, a wireless communication device comprising one or more wireless transceivers and a controller is provided. The one or more wireless transceiver is/are configured to detect one or more first frequency bands of one or more cellular networks according to measurement configuration received from one of the cellular networks, and detect one or more second frequency bands of one or more non-cellular networks. The controller is configured to determine whether there is at least one combination of one of the first frequency bands and one of the second frequency bands, wherein the first frequency band and the second frequency band in the combination do not overlap, and enable one of the wireless transceivers to send a first measurement report indicating that only the first frequency band in the combination is available to the one of the cellular networks, when there is the combination.

In yet another aspect of the application, a wireless communication device comprising one or more wireless transceivers and a controller is provided. The one or more wireless transceivers is/are configured to receive radio bearer configuration associated with a first frequency band of a first cellular network utilizing a first Radio Access Technology (RAT) from a second cellular network utilizing a second RAT, and detect one or more second frequency bands of one or more non-cellular networks. The controller is configured to determine whether there is at least one combination of the first frequency band and one of the second frequency bands, wherein the first frequency band and the second frequency band in the combination do not overlap, and enable one of the wireless transceivers to send a message to the second cellular network to indicate a failure to establish a connection on the first frequency band, when there is not the combination.

Other aspects and features of the present application will become apparent to those with ordinarily skill in the art upon review of the following descriptions of specific embodiments of the wireless communication devices and the methods for IDC interference prevention.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
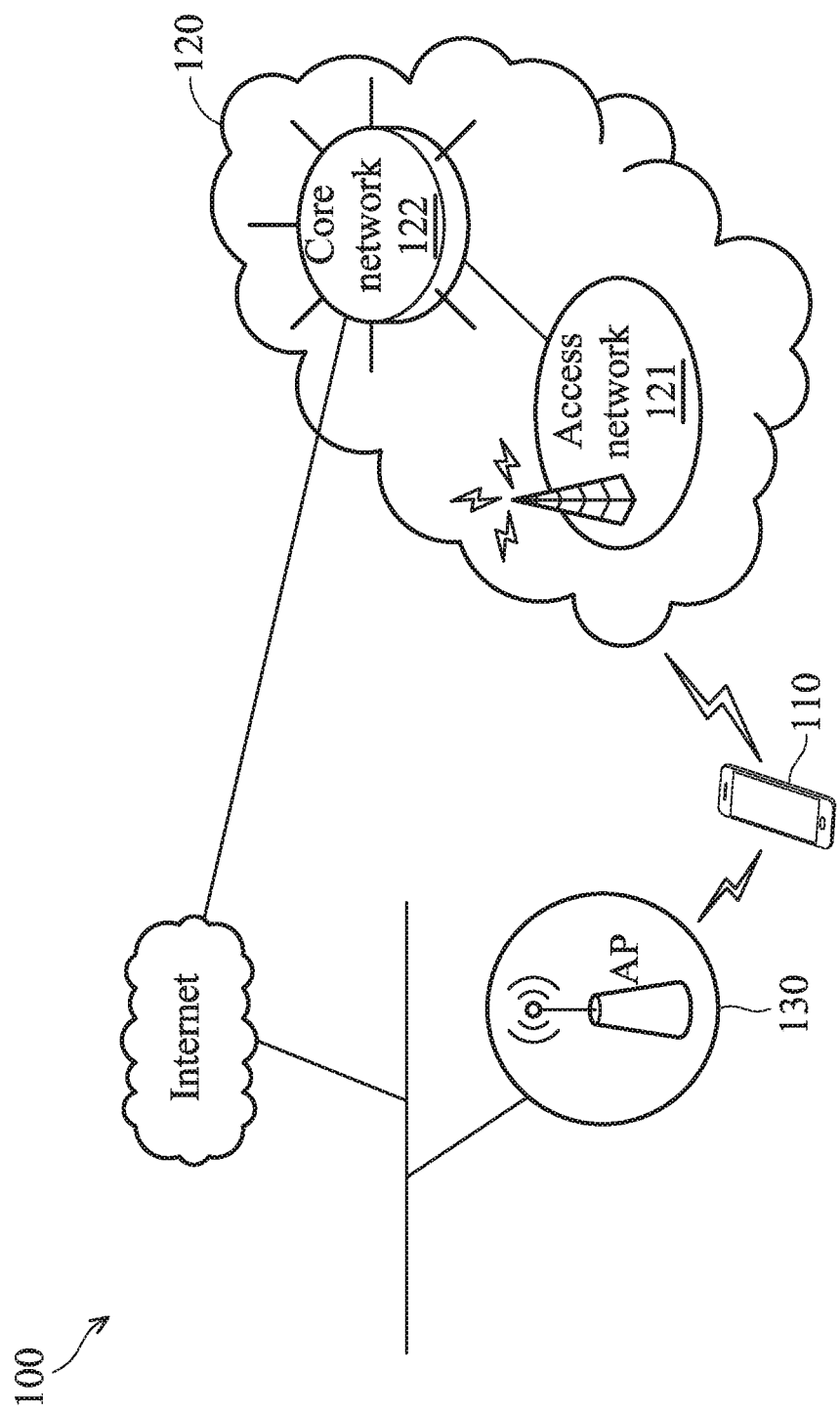
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a wireless communication device 110, a cellular network 120, and a non-cellular network 130. The wireless communication device 110 may wirelessly communicate with the cellular network 120 and/or the non-cellular network 130 for obtaining mobile services.

The wireless communication device 110 may be referred to as a User Equipment (UE) or Mobile Station (MS), such as a mobile phone (e.g., feature phone or smartphone), a panel Personal Computer (PC), a laptop computer, or any computing device supporting the wireless technologies utilized by the cellular network 120 and the non-cellular network 130.

The cellular network 120 may include an access network 121 and a core network 122. The access network 121 is responsible for processing radio signals, terminating radio protocols, and connecting the wireless communication device 110 with the core network 122, while the core network 122 is responsible for performing mobility management, network-side authentication, and interfaces with public/external networks (e.g., the Internet).

The access network 121 and the core network 122 may each include one or more network nodes for carrying out said functions. For example, if the cellular network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN).

If the cellular network 120 is a WCDMA network, the access network 121 may be a Universal Terrestrial Radio Access Network (UTRAN) and the core network 122 may be a General Packet Radio Service (GPRS) core, which includes a Home Location Register (HLR), at least one Serving GPRS Support Node (SGSN), and at least one Gateway GPRS Support Node (GGSN).

If the cellular network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the cellular network 120 is an NR network, the access network 121 may be a Next Generation-Radio Access Network (NG-RAN) which includes at least a gNB or Transmission Reception Point (TRP), and the core network 122 may be a Next Generation-Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The non-cellular network 130 may be a Wireless Local Area Network (WLAN) utilizing the Wi-Fi technology, or may be a Personal Area Network (PAN) utilizing the BT technology, or may be a Zigbee network, or may be a network utilizing another Short Range Wireless (SRW) technology.

For example, the non-cellular network 130 may be a WLAN formed by one or more Access Points (APs) utilizing the Wi-Fi technology. Specifically, each AP may connect to a local area network by an Ethernet cable, and they typically receive, buffer, and transmit data traffic, which is to be directed to and from the wireless communication device 110. In general, each AP may have, on average, a coverage varying from 20 meters in an area with obstacles (walls, stairways, elevators etc) to 100 meters in an area with a clear line of sight.

Figure 2:
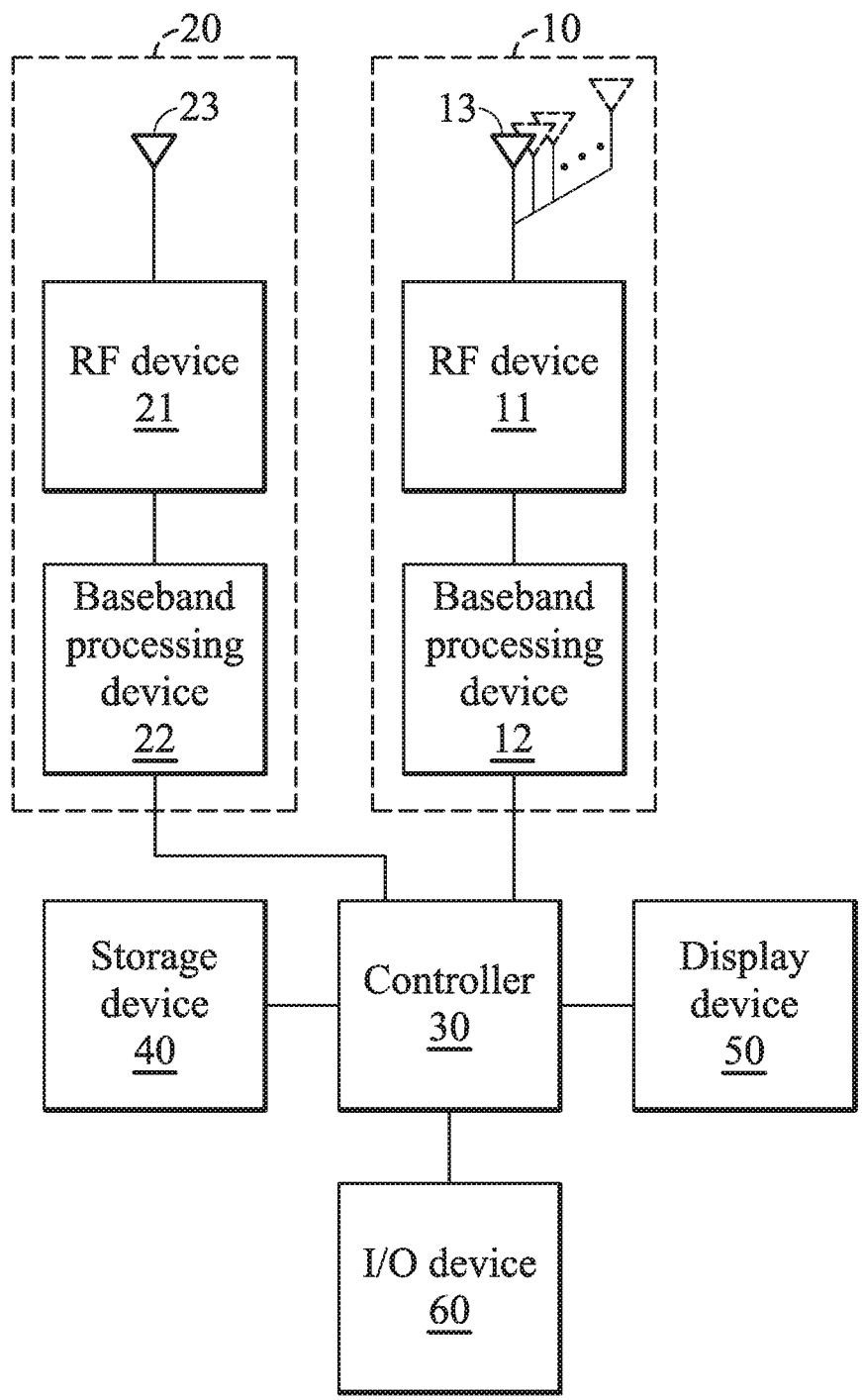
FIG. 2 is a block diagram illustrating the wireless communication device 110 according to an embodiment of the application.

FIG. 2 is a block diagram illustrating the wireless communication device 110 according to an embodiment of the application.

As shown in FIG. 2, the wireless communication device 110 may include two wireless transceivers 10 and 20, a controller 30, a storage device 40, a display device 50, and an Input/Output (I/O) device 60.

The wireless transceiver 10 is configured to perform wireless transmission and reception to and from the cellular network 120.

Specifically, the wireless transceiver 10 may include a Radio Frequency (RF) device 11, a baseband processing device 12, and antenna 13, wherein the antenna 13 may include an antenna array for beamforming.

The baseband processing device 12 is configured to perform baseband signal processing and control the communications between subscriber identity card(s) (not shown) and the RF device 11. In one embodiment, the subscriber identity card may be a Subscriber Identity Module (SIM) card or a Universal SIM (USIM) card, and may be inserted into a socket of the wireless communication device 110. In another embodiment, the subscriber identity card may be a virtual SIM/USIM or soft SIM/USIM, and may be embedded inside the wireless communication device 110 (e.g., may be written into the storage device 40). The baseband processing device 12 may contain multiple hardware components to perform the baseband signal processing, such as Analog-to-Digital Conversion (ADC)/Digital-to-Analog Conversion (DAC), gain adjusting, modulation/demodulation, encoding/decoding, and so on.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may include a mixer to multiply the baseband signals with a carrier oscillated in the radio frequency of the supported RATs, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 900 MHz, 2100 MHz, or 2.6 GHz utilized in LTE/LTE-A/TD-LTE systems, or any radio frequency (e.g., sub-6 GHz, 24.25 GHz-52.6 GHz for mmWave) utilized in 5G (e.g., NR) systems, or another radio frequency, depending on the RAT in use.

In another embodiment, the wireless transceiver 10 may include two sets of RF device and antenna for supporting Evolved-Universal Terrestrial Radio Access (E-UTRA)-NR Dual Connectivity (EN-DC).

The wireless transceiver 20 is configured to perform wireless transmission and reception to and from the non-cellular network 130.

Specifically, the wireless transceiver 20 may include an RF device 21, a baseband processing device 22, and an antenna 23.

The baseband processing device 22 is configured to perform baseband signal processing. The baseband processing device 22 may contain multiple hardware components to perform the baseband signal processing, such as ADC/DAC, gain adjusting, modulation/demodulation, encoding/decoding, and so on.

The RF device 21 may receive RF wireless signals via the antenna 23, convert the received RF wireless signals to baseband signals, which are processed by the baseband processing device 22, or receive baseband signals from the baseband processing device 22 and convert the received baseband signals to RF wireless signals, which are later transmitted via the antenna 23. The RF device 21 may also contain multiple hardware devices to perform radio frequency conversion. For example, the RF device 21 may include a mixer to multiply the baseband signals with a carrier oscillated in the radio frequency of the supported SRW technologies, wherein the radio frequency may be 2.4 GHz or 5 GHz utilized in Wi-Fi systems, or may be 2.402~2.480 GHz utilized in BT systems, or another radio frequency, depending on the SRW technology in use.

In another embodiment, the wireless transceivers 10 and 20 may be incorporated into a single wireless transceiver. That is, the single wireless transceiver may include a combo RF device to support wireless transceiving to and from the cellular network 120 and the non-cellular network 130.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cellular network 120, controlling the wireless transceiver 20 for wireless communications with the non-cellular network 130, storing and retrieving data (e.g., program code) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the method for IDC interference prevention.

In another embodiment, the controller 30 may be incorporated into the baseband processing device 12 or the baseband processing device 22, to serve as a baseband processor.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the available frequency bands of the cellular network 120, which are detected by the wireless transceiver 10, the available frequency bands of the non-cellular network 130, which are detected by the wireless transceiver 20, and a suggestion list including frequency bands that may prevent IDC interference), instructions, and/or program code of applications, communication protocols, and/or the method for IDC interference prevention.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the wireless communication device 110 may include more components, such as a Global Positioning System (GPS) device for use of some location-based services or applications, and/or a battery for powering the other components of the wireless communication device 110, etc. Alternatively, the wireless communication device 110 may include fewer components. For example, the wireless communication device 110 may not include the display device 50 and/or the I/O device 60.

Figure 3A:
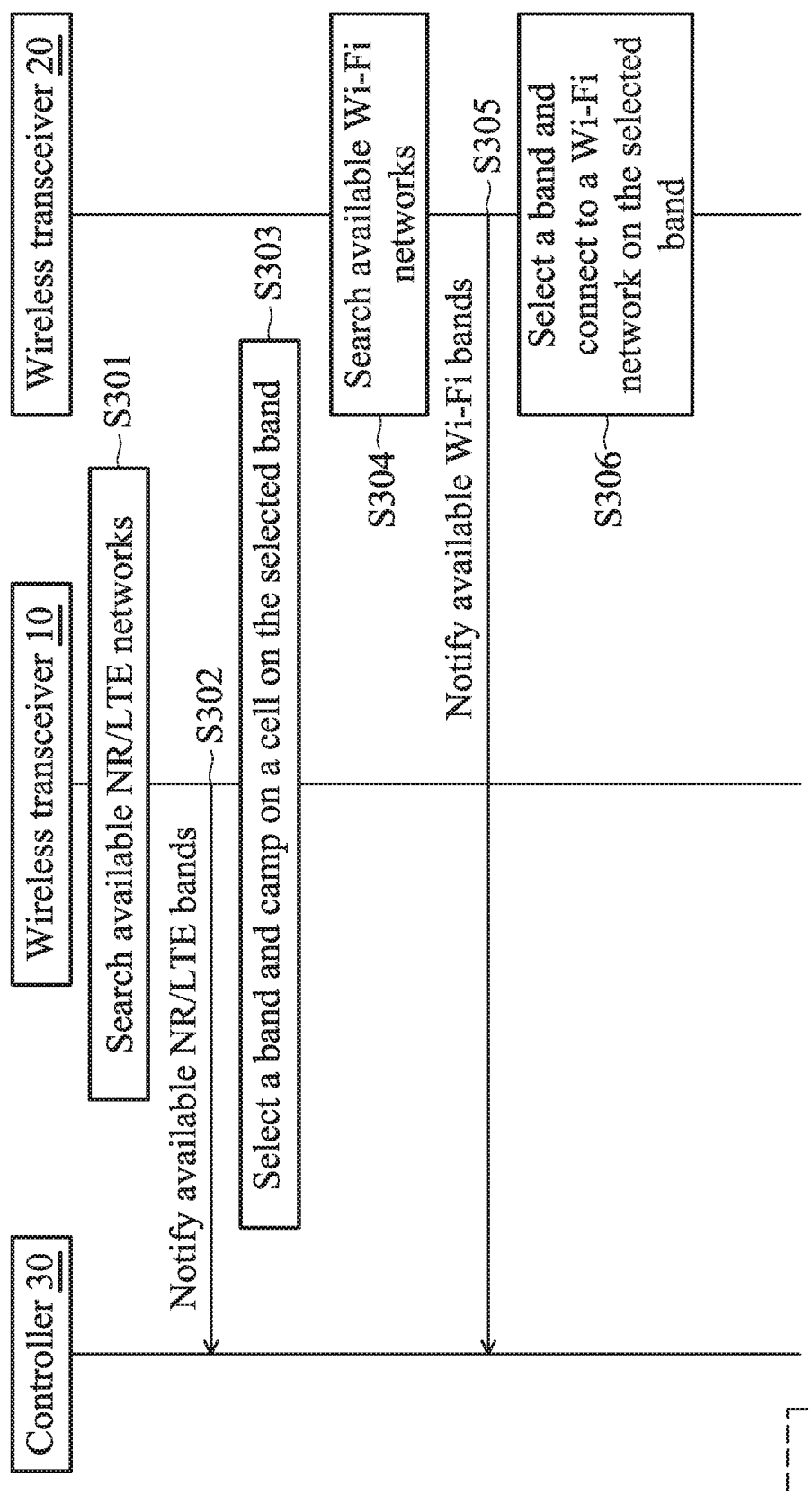
FIGS. 3A and 3B show a message sequence chart illustrating IDC interference prevention in an idle mode according to an embodiment of the application.
Figure 3B:
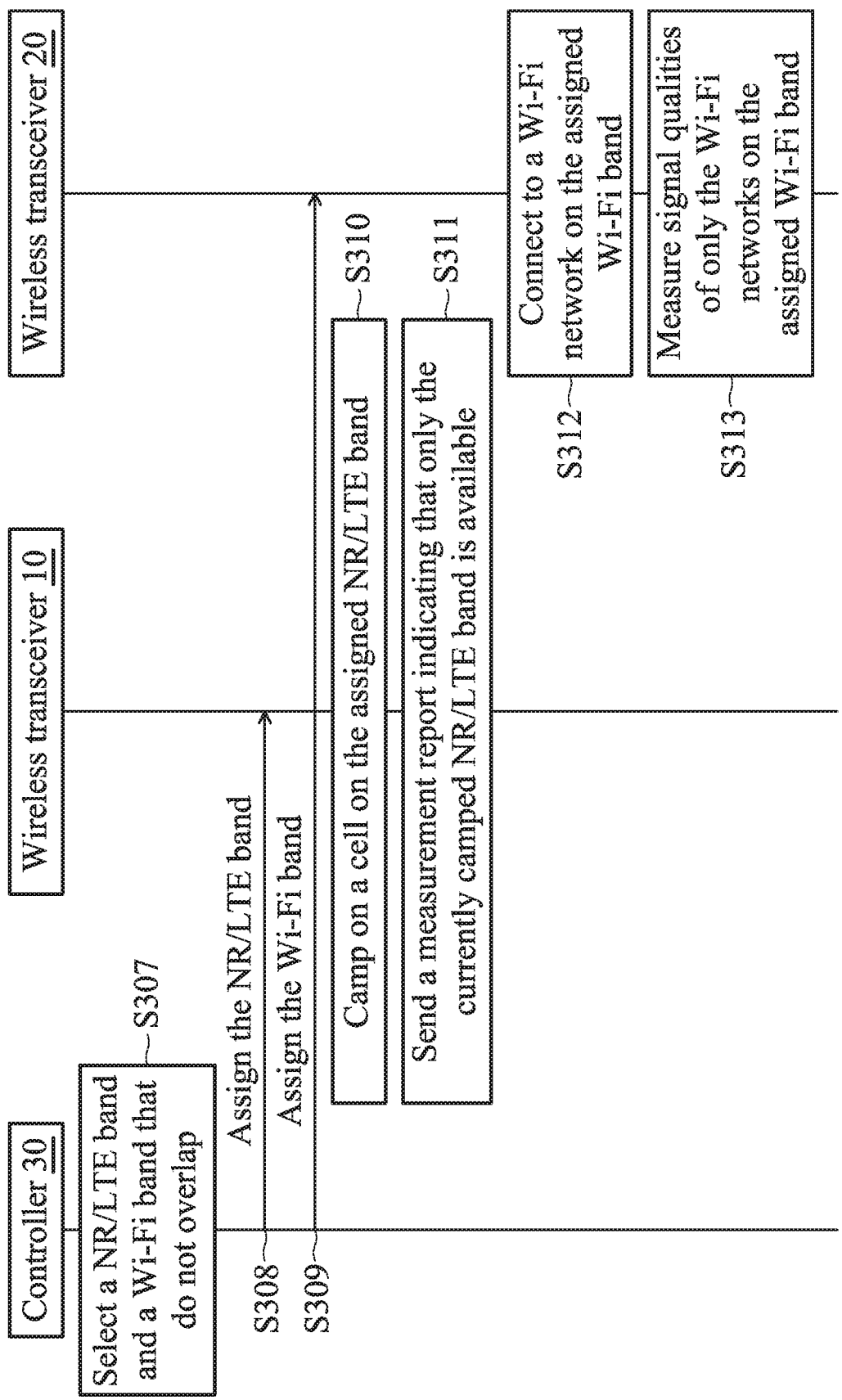

FIGS. 3A and 3B show a message sequence chart illustrating IDC interference prevention in an idle mode according to an embodiment of the application.

In this embodiment, the method for IDC interference prevention is applied to and executed by the wireless communication device 110 when it is in an idle mode (e.g., the RRC_IDLE mode as specified in 3GPP TS 36.331).

To begin with, after the wireless communication device 110 is powered on, the wireless transceiver 10 may search for available cellular networks and detect one or more first frequency bands of the available cellular networks during the search (step S301).

In one embodiment, each of the cellular networks may be an LTE/LTE-A/TD-LTE network or an NR network, and the first frequency bands are NR/LTE frequency bands.

Next, the wireless transceiver 10 may notify the controller 30 of the first frequency bands (step S302).

Subsequently, the wireless transceiver 10 may select a suitable cell on one of the first frequency bands and camp on the cell on the selected band (step S303).

In another embodiment, step S303 may be performed prior to step S302, and in step S302, the wireless transceiver 10 may also notify the controller 30 of the first frequency band of the cell that the wireless transceiver 10 is currently camped on.

After the wireless communication device 110 is powered on, the wireless transceiver 20 may also search for available non-cellular networks and detects one or more second frequency bands of the available non-cellular networks during the search (step S304).

In one embodiment, each of the non-cellular networks may be a Wi-Fi network, and the second frequency bands are Wi-Fi frequency bands.

Next, the wireless transceiver 20 may notify the controller 30 of the second frequency bands (step S305).

Subsequently, the wireless transceiver 20 may select a non-cellular network on one of the second frequency bands and connect to the non-cellular network on the selected band (step S306).

In another embodiment, step S306 may be performed prior to step S305, and in step S305, the wireless transceiver 20 may also notify the controller 30 of the second frequency band of the non-cellular network that the wireless transceiver 20 is currently connected to.

After obtaining the first frequency bands and the second frequency bands, the controller 30 may select one of the first frequency bands and one of the second frequency bands, which do not overlap (step S307).

In one embodiment, the controller 30 may determine combinations of one of the first frequency bands and one of the second frequency bands, which do not overlap, and in step S307, select from the combinations. An example of combinations of non-overlapping frequency bands is presented below in table 1 for the convenience of understanding.

TABLE 1

| Available frequency bands detected by the wireless transceiver 10 | Available frequency bands detected by the wireless transceiver 20 | ⇒ | Combinations of non-overlapping frequency bands |
|---|---|---|---|
| A | A | | (A, C), (A, D), (B, A), |
| B | C | | (B, C), (B, D), (C, A), |
| C | D | | (C, D) |

In the example as shown in Table 1, the frequency bands A, B, C, and D do not overlap with each other.

After that, the controller 30 assigns the selected first frequency band to the wireless transceiver 10 (step S308), and assigns the selected second frequency band to the wireless transceiver 20 (step S309).

In response to being assigned with the selected first frequency band, the wireless transceiver 10 may be enabled to camp on a cell on the selected first frequency band (step S310), and to send a measurement report indicating that only the selected first frequency band is available to the cell on the selected first frequency band (step S311). In some embodiments, the measurement report can be sent periodically.

In response to being assigned with the selected second frequency band, the wireless transceiver 20 may be enabled to connect to a non-cellular network on the selected second frequency band (step S312), and to measure the signal qualities of only the non-cellular networks on the selected second frequency band (step S313).

In another embodiment, steps S308~S313 may be performed when the controller 30 is notified of one or more predetermined usage scenarios being launched or a user input being received. For example, some usage scenarios need higher connection throughput (e.g. video streaming, gaming, etc.) and thus IDC interference prevention is desired. Then steps S308~S313 can be performed if one or more usage scenarios are launched. Besides, in another example, anytime user believes IDC interference should be prevented, the user can perform an input to notify the controller 30. Later, when the predetermined usage scenario is suspended or terminated, the controller 30 may instruct the wireless transceivers 10 and 20 to cancel the limitations of staying on the selected frequency bands only.

In view of the forgoing embodiment of FIGS. 3A and 3B, it will be appreciated that the present application realizes IDC interference prevention by proactively enabling the wireless transceiver 10 and the wireless transceiver 20 to reselect to frequency bands that do not overlap with each other.

Figure 4A:
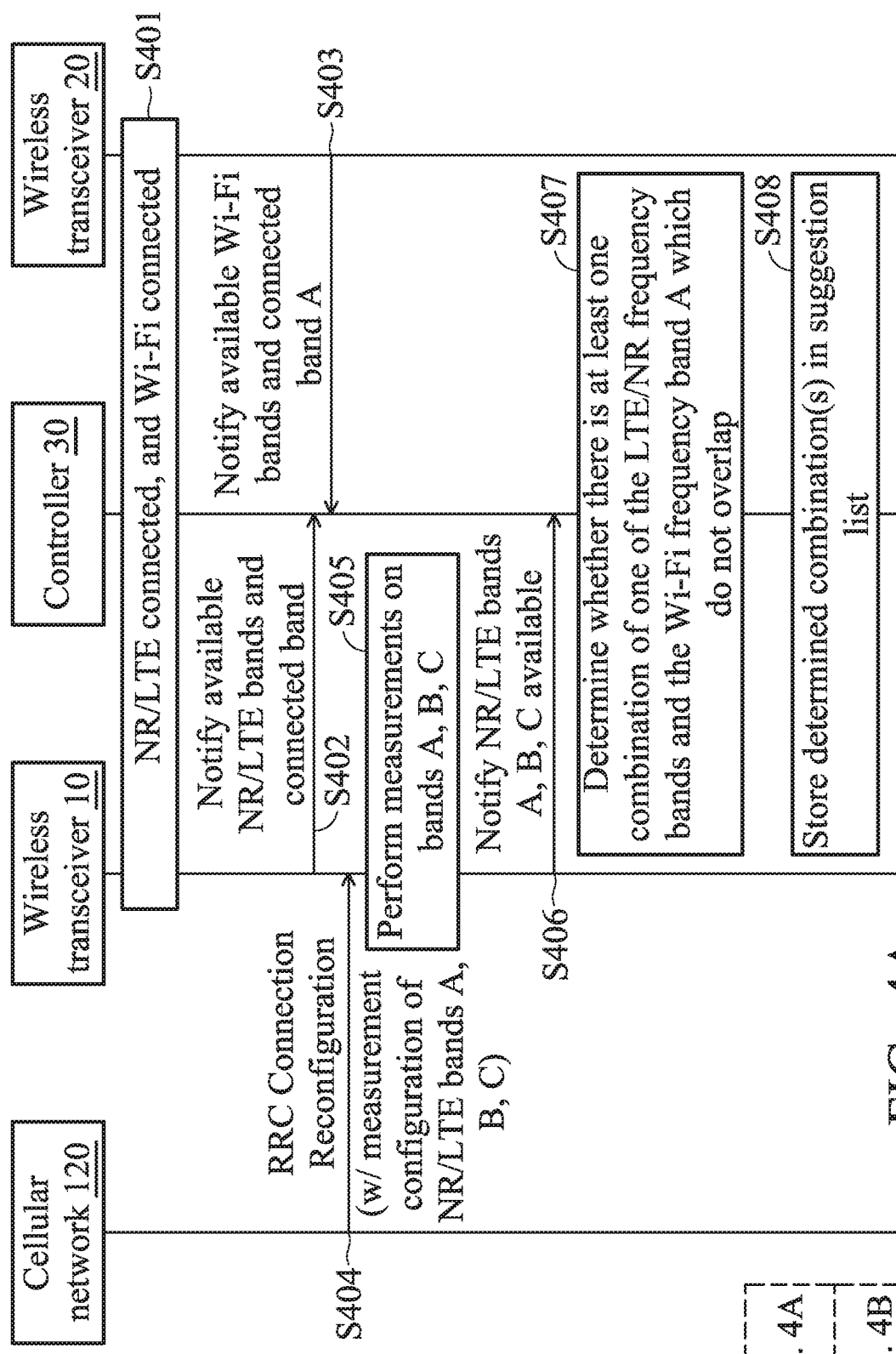
FIGS. 4A and 4B show a message sequence chart illustrating IDC interference prevention in a connected mode according to an embodiment of the application.
Figure 4B:
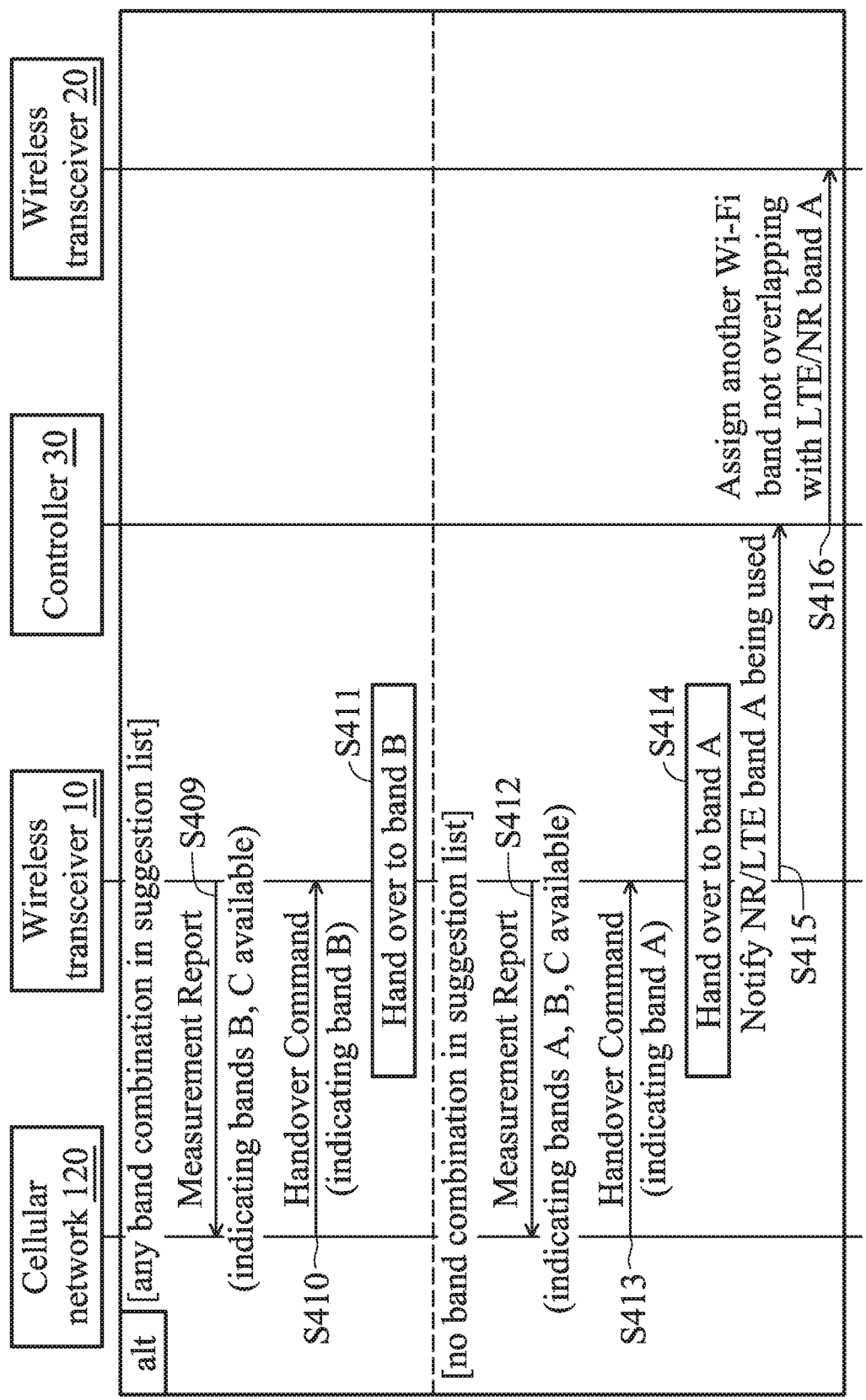

FIGS. 4A and 4B show a message sequence chart illustrating IDC interference prevention in a connected mode according to an embodiment of the application.

In this embodiment, the method for IDC interference prevention is applied to and executed by the wireless communication device 110 when it is in a connected mode (e.g., the RRC_CONNECTED mode as specified in 3GPP TS 36.331).

To begin with, the wireless transceiver 10 is connected to the cellular network 120 (e.g., an NR/LTE network), while the wireless transceiver 20 is connected to the non-cellular network 130 (e.g., a Wi-Fi network) (step S401).

Although not shown, before step S401, the wireless transceiver 10 may search for available NR/LTE networks and detect one or more NR/LTE frequency bands of the available NR/LTE networks during the search, and the wireless transceiver 20 may also search for available Wi-Fi networks and detect one or more Wi-Fi frequency bands of the available Wi-Fi networks during the search.

Next, the wireless transceiver 10 may notify the controller 30 of the NR/LTE frequency bands, including the NR/LTE frequency band of the cell that the wireless transceiver 10 is currently connected to (step S402), and the wireless transceiver 20 may notify the controller 30 of the Wi-Fi frequency bands, including the Wi-Fi frequency band (denoted as A) of an AP that the wireless transceiver 20 is currently connected to (step S403).

After that, the cellular network 120 may send an RRC (Radio Resource Control) Connection Reconfiguration message including measurement configuration to the wireless transceiver 10, wherein the measurement configuration includes information of several LTE/NR frequency bands (denoted as A, B, C) (step S404).

Subsequently, the wireless transceiver 10 may perform measurements according to the measurement configuration (step S405), and notify the controller 30 of that the LTE/NR frequency bands indicated in the measurement configuration are available (i.e., A, B, C) (step S406).

In response to receiving the notification, the controller 30 may determine whether there is at least one combination of one of the LTE/NR frequency bands and the Wi-Fi frequency band A, wherein the LTE/NR frequency band and the Wi-Fi frequency band A in the combination do not overlap (step S407), and store the determined combination(s) in a suggestion list (step S408).

Subsequent to step S408, if the suggestion list includes at least one combination of an LTE/NR frequency band and the Wi-Fi frequency band A which do not overlap, the wireless transceiver 10 sends a measurement report indicating that only the LTE/NR frequency band(s) (denoted as B and C) in the suggestion list is/are available to the cellular network 120 (step S409). In one embodiment, the wireless transceiver 10 may be enabled by the controller 30 via the content of the suggestion list, to send the measurement report in step S409.

Subsequent to step S409, the wireless transceiver 10 may receive a handover command from the cellular network 120, which indicates a handover to one of the reported LTE/NR frequency bands (denoted as B) (step S410).

The handover may be an intra-RAT handover, which refers a handover from one cell to another cell utilizing the same RAT. Alternatively, the handover may be an inter-RAT handover that refers a handover from one cell to another cell utilizing different RATs (e.g., a handover from an LTE cell to an NR cell).

In response to receiving the handover command, the wireless transceiver 10 may hand over to another cell on the LTE/NR frequency band B indicated in the handover command (step S411). That is, the wireless transceiver 10 may release the original connection and establish a new connection with the other cell on the LTE/NR frequency band B.

Subsequent to step S408, if the suggestion list does not include any combination of an LTE/NR frequency band and the Wi-Fi frequency band A which do not overlap, the wireless transceiver 10 may send a measurement report indicating that all LTE/NR frequency bands (denoted as A, B, C) are available to the cellular networks (step S412).

Subsequent to step S412, the wireless transceiver 10 may receive a handover command from the cellular network 120, which indicates a handover to one of the reported LTE/NR frequency bands (denoted as A) (step S413).

In response to receiving the handover command, the wireless transceiver 10 may hand over to another cell on the LTE/NR frequency band A (step S414), and notify the controller 30 of that the wireless transceiver 10 is using this particular LTE/NR frequency band A (step S415).

In response to receiving the notification, the controller 30 may assign another Wi-Fi frequency band not overlapping with the LTE/NR frequency band A to the wireless transceiver 20, thereby enabling the wireless transceiver 20 to connect to the same or another non-cellular network on the assigned Wi-Fi frequency band (step S416).

In view of the forgoing embodiment of FIGS. 4A and 4B, it will be appreciated that the present application realizes IDC interference prevention by enabling the wireless transceiver 10 to exclude, from the measurement report, the information of the NR frequency bands overlapping with the second frequency band on which the wireless transceiver 20 is connected to the non-cellular network 130.

Figure 5A:
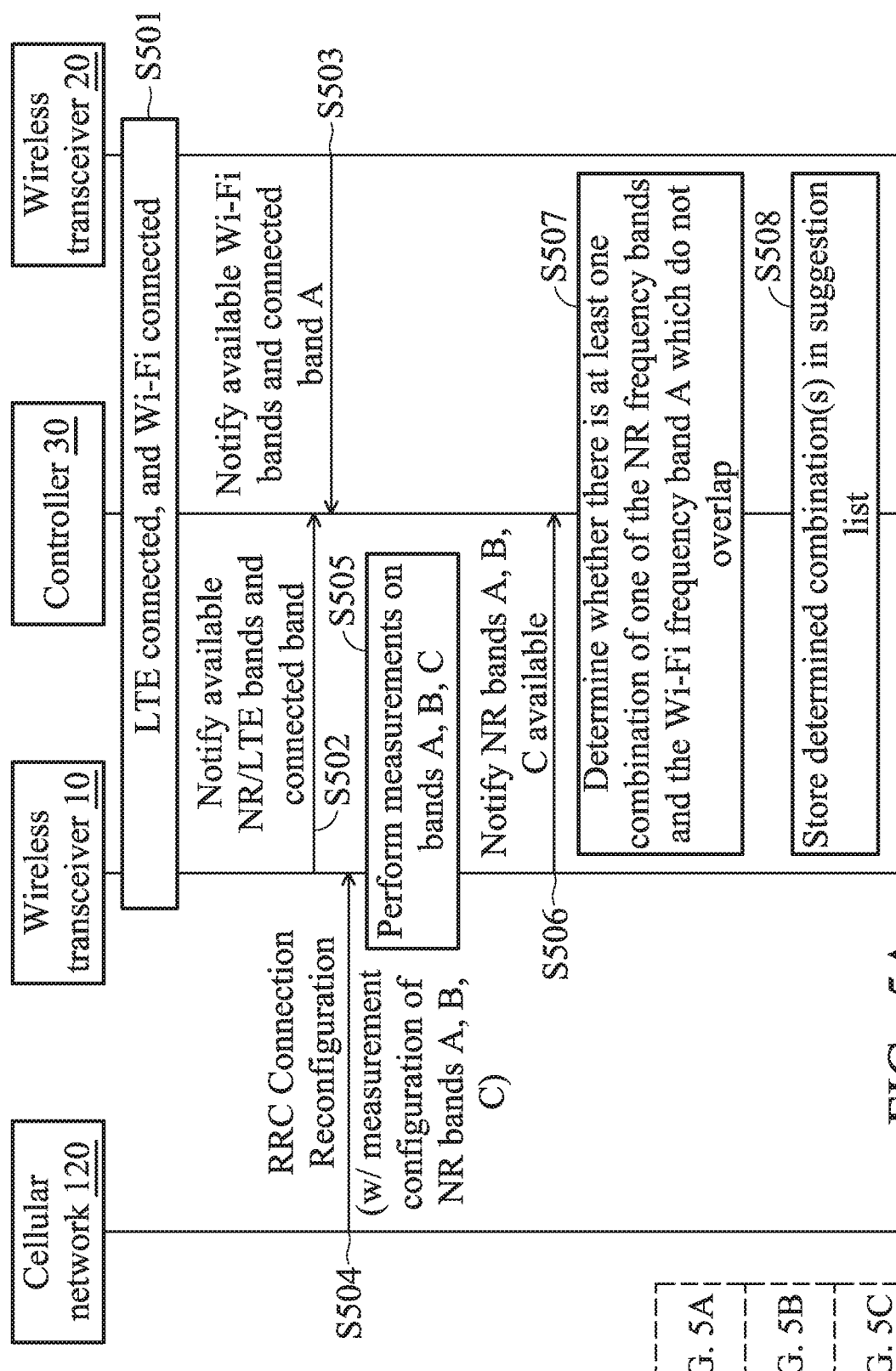
FIGS. 5A~5C show a message sequence chart illustrating IDC interference prevention in a connected mode according to another embodiment of the application.
Figure 5B:
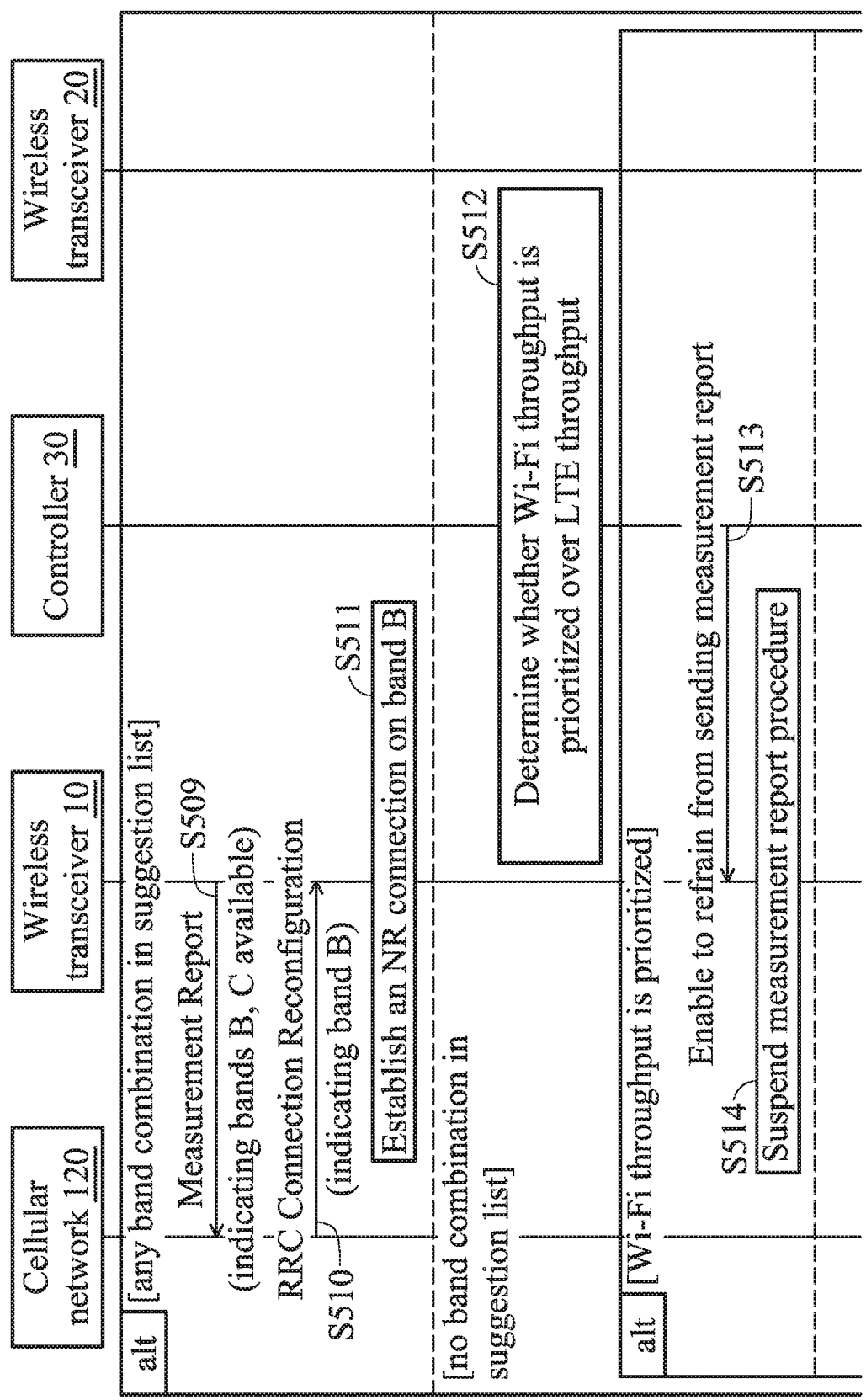
Figure 5C:
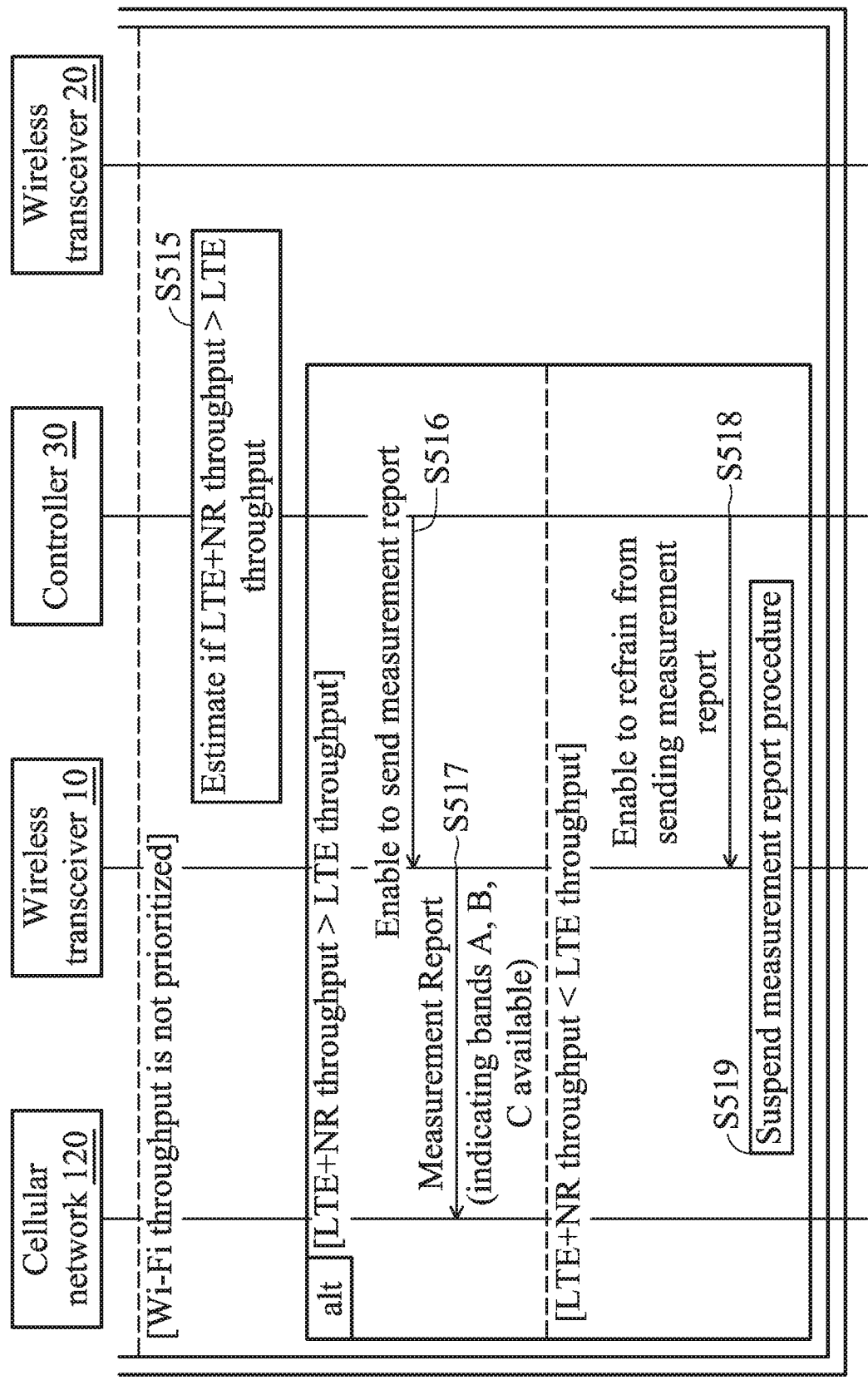

FIGS. 5A~5C show a message sequence chart illustrating IDC interference prevention in a connected mode according to another embodiment of the application.

In this embodiment, the method for IDC interference prevention is applied to and executed by the wireless communication device 110 when it is in a connected mode (e.g., the RRC_CONNECTED mode as specified in 3GPP TS 36.331) with the cellular network 120 being an LTE network supporting EN-DC.

To begin with, the wireless transceiver 10 is connected to the cellular network 120 (e.g., an LTE network), while the wireless transceiver 20 is connected to the non-cellular network 130 (e.g., a Wi-Fi network) (step S501).

Although not shown, before step S501, the wireless transceiver 10 may search for available LTE/NR networks and detect one or more LTE/NR frequency bands of the available LTE/NR networks during the search, and the wireless transceiver 20 may also search for available Wi-Fi networks and detect one or more Wi-Fi frequency bands of the available Wi-Fi networks during the search.

Next, the wireless transceiver 10 may notify the controller 30 of the LTE/NR frequency bands, including the LTE/NR frequency band of the cell that the wireless transceiver 10 is currently connected to (step S502), and the wireless transceiver 20 may notify the controller 30 of the Wi-Fi frequency bands, including the Wi-Fi frequency band (denoted as A) of the AP that the wireless transceiver 20 is currently connected to (step S503).

After that, the cellular network 120 may send an RRC Connection Reconfiguration message including measurement configuration to the wireless transceiver 10, wherein the measurement configuration includes information of several NR frequency bands (denoted as A, B, C) (step S504).

Subsequently, the wireless transceiver 10 may perform measurements according to the measurement configuration (step S505), and notify the controller 30 of the available NR frequency bands (i.e., A, B, C) (step S506).

In response to receiving the notification, the controller 30 may determine whether there is at least one combination of one of the NR frequency bands and the Wi-Fi frequency band A, wherein the NR frequency band and the Wi-Fi frequency band A in the combination do not overlap (step S507), and store the determined combination(s) in a suggestion list (step S508).

Subsequent to step S508, if the suggestion list includes at least one combination of an NR frequency band and the Wi-Fi frequency band A which do not overlap, the wireless transceiver 10 may send a measurement report indicating that only the NR frequency band(s) (denoted as B and C) in the suggestion list is/are available to the cellular network 120 (step S509). In one embodiment, the wireless transceiver 10 may be enabled by the controller 30 via the content of the suggestion list, to send the measurement report in step S509.

Subsequent to step S509, the wireless transceiver 10 may receive an RRC Connection Reconfiguration message from the cellular network 120, which includes information of at least one of the reported NR frequency bands (denoted as B) (step S510).

In response to receiving the RRC Connection Reconfiguration message, the wireless transceiver 10 may establish an NR connection on the NR frequency band B indicated in the RRC Connection Reconfiguration message (step S511).

Subsequent to step S508, if the suggestion list does not include any combination of an NR frequency band and the Wi-Fi frequency band A which do not overlap, the controller 30 may determine whether the Wi-Fi throughput is prioritized over the LTE throughput (step 512).

For example, if a predetermined usage scenario is launched (e.g., a gaming APP is running) and it relies upon the throughput of the wireless transceiver 20, then the Wi-Fi throughput may be prioritized over the LTE throughput. Otherwise, the Wi-Fi throughput may not be prioritized over the LTE throughput.

Subsequent to step S512, if the Wi-Fi throughput is prioritized over the LTE throughput, the controller 30 may enable the wireless transceiver 10 to refrain from sending a measurement report indicating that the NR frequency bands are available to the cellular network 120 (step S513).

In response to receiving the instruction from the controller 30, the wireless transceiver 10 may suspend the measurement report procedure (e.g. discard or not send a measurement report) (step S514). Alternatively, the wireless transceiver 10 may send a measurement report faking that the signal qualities measured on the NR frequency bands are bad. That is, by not sending a normal measurement report, or by sending a fake measurement report, the wireless transceiver 10 may not receive an RRC Connection Reconfiguration message from the cellular network 120 to request the wireless transceiver 10 to establish an NR connection, which may cause IDC interference to the wireless transceiver 20.

Subsequent to step S512, if the Wi-Fi throughput is not prioritized over the LTE throughput (e.g. the LTE throughput is prioritized over the Wi-Fi throughput), the controller 30 may estimate whether the LTE throughput is going to increase with an NR connection to be established on one of the NR frequency bands (step S515).

Specifically, in the situations where the NR frequency band of the NR connection overlaps with the Wi-Fi frequency band A, time-sharing may be required between the wireless transceiving operations of the wireless transceivers 10 and 20. Therefore, if the NR connection is established, the IDC interference caused by the overlapping frequency bands may impact the throughput of the wireless transceiver 10.

Subsequent to step S515, if the LTE throughput is going to increase with an NR connection to be established on one of the NR frequency bands, the controller 30 may enable the wireless transceiver 10 to send a measurement report indicating that the NR frequency bands are available to the cellular network 120 (step S516).

In response to being enabled by the controller 30, the wireless transceiver 10 may send a measurement report indicating that the NR frequency bands (i.e., A, B, C) are available to the cellular network 120 (step S517).

Subsequent to step S515, if the LTE throughput is not going to increase with an NR connection to be established on one of the NR frequency bands, the controller 30 may enable the wireless transceiver 10 to refrain from sending a measurement report indicating that the NR frequency bands are available to the cellular network 120 (step S518).

In response to being enabled by the controller 30, the wireless transceiver 10 may suspend the measurement report procedure (i.e., discard or not send any measurement report) (step S519).

Although not shown, subsequent to step S517, the wireless transceiver 10 may receive an RRC Connection Reconfiguration message indicating to establish an NR connection (similar to steps S510 and S511).

Please note that the addition of an NR connection may be triggered by the measurement report when the measurement report includes information of any available NR frequency band with a good signal quality. In view of the forgoing embodiment of FIGS. 5A~5C, it will be appreciated that the present application realizes IDC interference prevention by enabling the wireless transceiver 10 to refrain from sending any measurement report including information of the NR frequency bands, or to not include information of the NR frequency bands overlapping with the second frequency band on which the wireless transceiver 20 is connected to the non-cellular network 130, or to include fake information indicating that the signal quality of each of the NR frequency bands is bad.

Figure 6A:
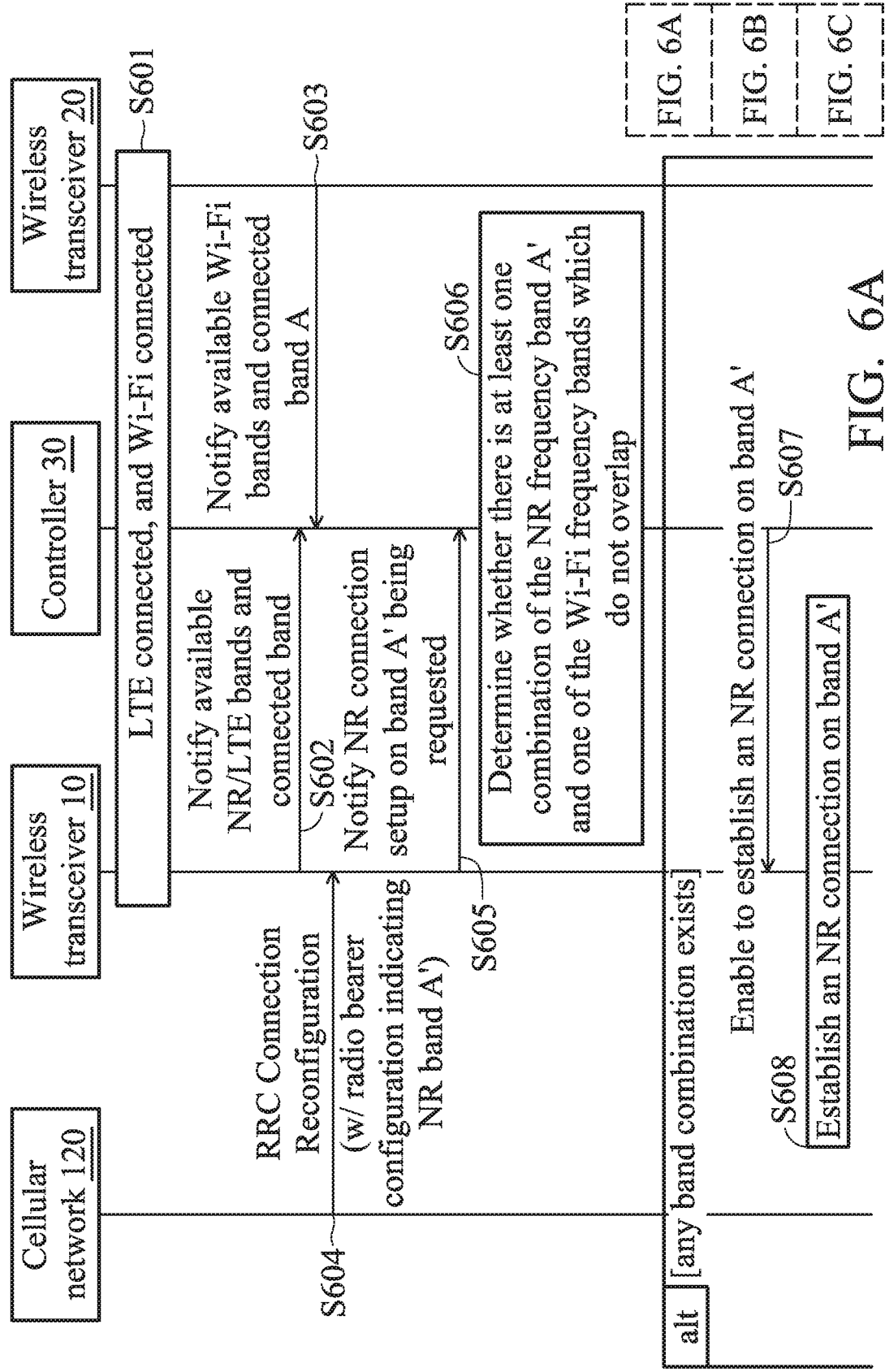
FIGS. 6A~6C show a message sequence chart illustrating IDC interference prevention in a connected mode according to another embodiment of the application.
Figure 6B:
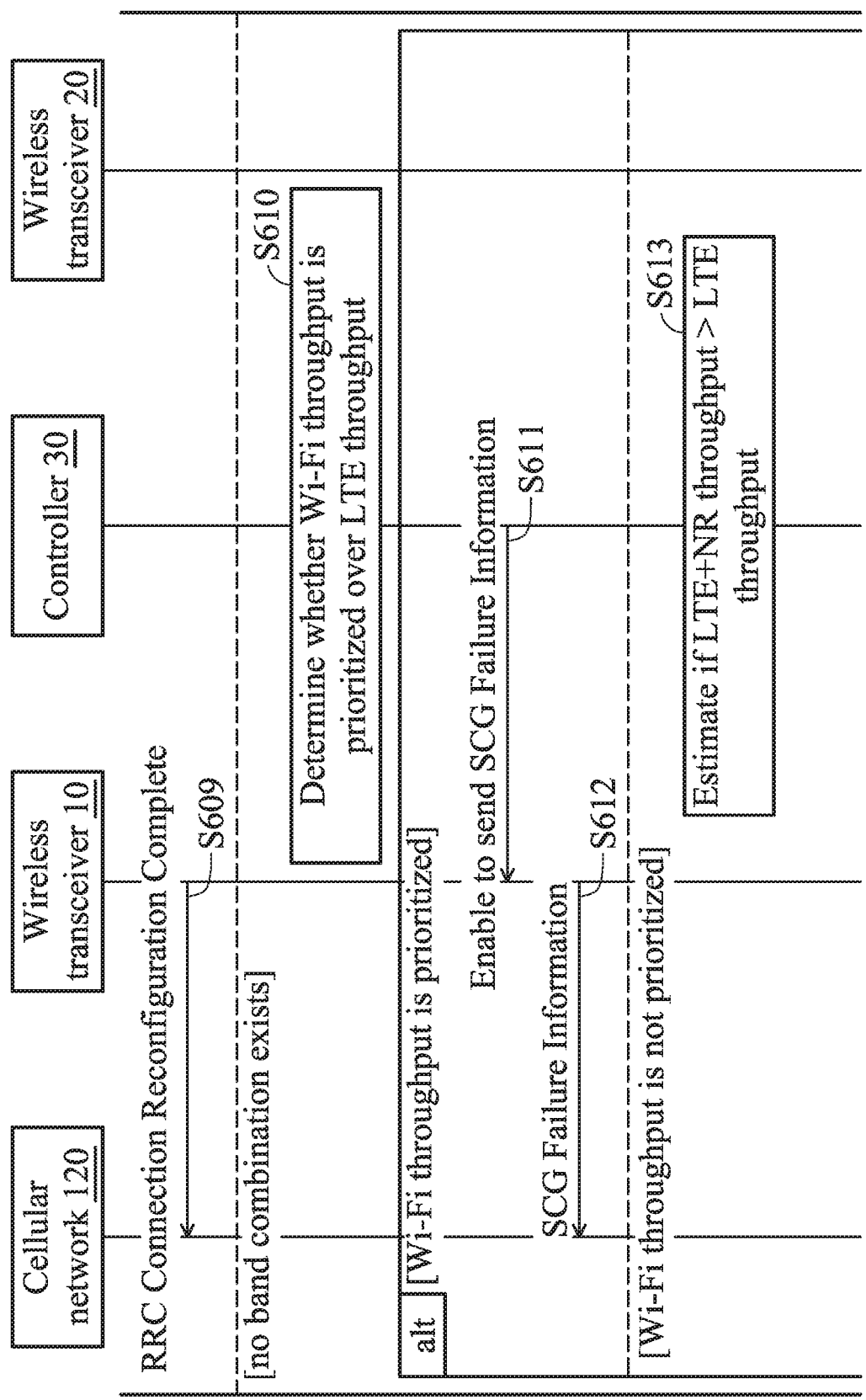
Figure 6C:
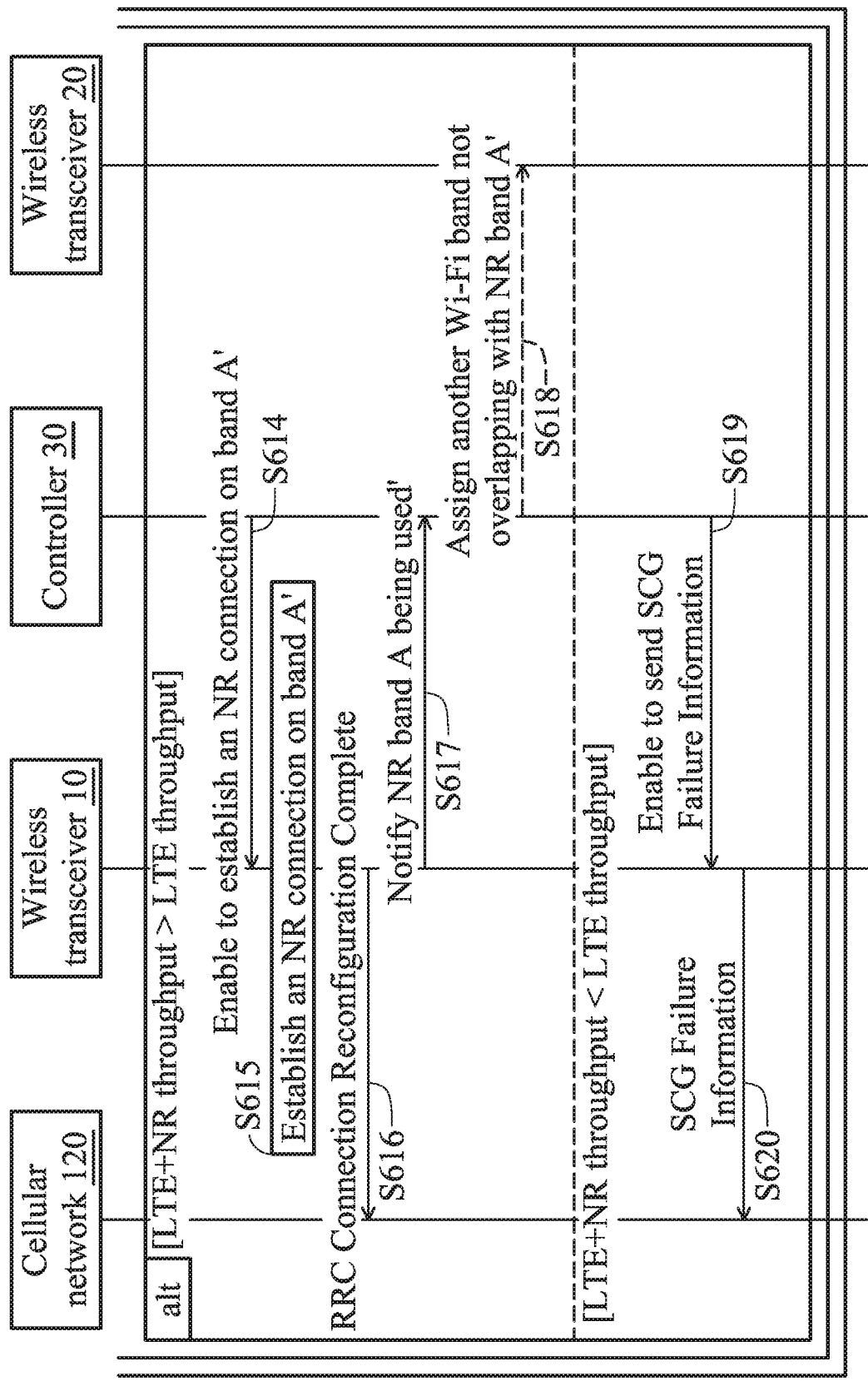

FIGS. 6A~6C show a message sequence chart illustrating IDC interference prevention in a connected mode according to another embodiment of the application.

In this embodiment, the method for IDC interference prevention is applied to and executed by the wireless communication device 110 when it is in a connected mode (e.g., the RRC_CONNECTED mode as specified in 3GPP TS 36.331) with the cellular network 120 being an LTE network supporting EN-DC.

To begin with, the wireless transceiver 10 is connected to the cellular network 120 (e.g., an LTE network), while the wireless transceiver 20 is connected to the non-cellular network 130 (e.g., a Wi-Fi network) (step S601).

Although not shown, before step S601, the wireless transceiver 10 may search for available LTE/NR networks and detect one or more LTE/NR frequency bands of the available LTE/NR networks during the search, and the wireless transceiver 20 may also search for available Wi-Fi networks and detect one or more Wi-Fi frequency bands of the available Wi-Fi networks during the search.

Next, the wireless transceiver 10 may notify the controller 30 of the LTE/NR frequency bands, including the LTE/NR frequency band of the cell that the wireless transceiver 10 is currently connected to (step S602), and the wireless transceiver 20 may notify the controller 30 of the Wi-Fi frequency bands, including the Wi-Fi frequency band (denoted as A) of the AP that the wireless transceiver 20 is currently connected to (step S603).

After that, the wireless transceiver 10 may receive an RRC Connection Reconfiguration message from the cellular network 120, which includes radio bearer configuration of an NR cell on an NR frequency band (denoted as A') (step S604), and then notify the controller 30 of that an NR connection setup on the NR frequency band is requested (step S605).

In response to receiving the notification, the controller 30 may determine whether there is at least one combination of the NR frequency band A' and one of the Wi-Fi frequency bands, wherein the NR frequency band A' and the Wi-Fi frequency band (e.g., the Wi-Fi frequency band A) in the combination do not overlap (step S606).

Subsequent to step S606, if there is at least one combination of the NR frequency band A' and a Wi-Fi frequency band which do not overlap, the controller 30 may enable the wireless transceiver 10 to establish a connection with the NR cell on the NR frequency band A' according to the radio bearer configuration (step S607).

In response to being enabled by the controller 30, the wireless transceiver 10 may establish a connection with the NR cell on the NR frequency band A' according to the radio bearer configuration in the RRC Connection Reconfiguration message (step S608), and send an RRC Connection Reconfiguration Complete message to the cellular network 120 (step S609).

Subsequent to step S606, if there is no combination of the NR frequency band A' and a Wi-Fi frequency band that do not overlap, the controller 30 may determine whether the Wi-Fi throughput is prioritized over the LTE throughput (step S610).

For example, if a predetermined usage scenario is launched (e.g., a gaming APP is running) and it relies upon the throughput of the wireless transceiver 20, then the Wi-Fi throughput may be prioritized over the LTE throughput. Otherwise, the Wi-Fi throughput may not be prioritized over the LTE throughput.

Subsequent to step S610, if the Wi-Fi throughput is prioritized over the LTE throughput, the controller 30 may enable the wireless transceiver 10 to send an SCG (Secondary Cell Group) Failure Information message to the cellular network 120 (step S611). Specifically, the SCG Failure Information message is used to indicate a failure to establish a connection according to the radio bearer configuration in the RRC Connection Reconfiguration message. In one embodiment, step S611 may be performed when there is no ongoing NR call associated with the wireless transceiver 10.

In response to being enabled by the controller 30, the wireless transceiver 10 may send an SCG Failure Information message to the cellular network 120 (step S612).

Subsequent to step S610, if the Wi-Fi throughput is not prioritized over the LTE throughput (e.g. the LTE throughput is prioritized over the Wi-Fi throughput), the controller 30 may estimate whether the LTE throughput is going to increase with an NR connection to be established on the NR frequency band A' (step S613).

Specifically, in the situations where the NR frequency band A' overlaps with the Wi-Fi frequency band A, time-sharing may be required between the wireless transceiving operations of the wireless transceivers 10 and 20. Therefore, if the NR connection is established, the IDC interference caused by the overlapping frequency bands may impact the throughput of the wireless transceiver 10.

Subsequent to step S613, if the LTE throughput is going to increase with an NR connection to be established on the NR frequency band A', the controller 30 may enable the wireless transceiver 10 to establish an NR connection on the NR frequency band A' according to the radio bearer configuration in the RRC Connection Reconfiguration message (step S614).

In response to being enabled by the controller 30, the wireless transceiver 10 may establish an NR connection on the NR frequency band A' according to the radio bearer configuration in the RRC Connection Reconfiguration message (step S615).

After that, the wireless transceiver 10 may send an RRC Connection Reconfiguration Complete message to the cellular network 120 (step S616), and notify the controller 30 of that the wireless transceiver 10 is using the NR frequency band A' (step S617).

In response to receiving the notification, the controller 30 may assign another Wi-Fi frequency band not overlapping with the NR frequency band A' to the wireless transceiver 20 if the NR frequency band A' overlaps with the Wi-Fi frequency band A, thereby enabling the wireless transceiver 20 to connect to the same or another Wi-Fi network on the assigned Wi-Fi frequency band (step S618).

Subsequent to step S613, if the LTE throughput is not going to increase with an NR connection to be established on the NR frequency band A', the controller 30 may enable the wireless transceiver 10 to send an SCG Failure Information message to the cellular network 120 (step S619).

In response to being enabled by the controller 30, the wireless transceiver 10 may send an SCG Failure Information message to the cellular network 120 (step S620).

In view of the forgoing embodiment of FIGS. 6A~6C, it will be appreciated that the present application realizes IDC interference prevention by enabling the wireless transceiver 10 to send an SCG Failure Information message without trying to establish a connection according to the radio bearer configuration in the RRC Connection Reconfiguration message.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A wireless communication device, comprising:
one or more wireless transceivers, configured to detect one or more first frequency bands of one or more cellular networks, and detect one or more second frequency bands of one or more non-cellular networks; and
a controller, configured to:
select one of the first frequency bands and one of the second frequency bands, which do not overlap;
assign the selected first frequency band to one of the wireless transceivers, thereby enabling one of the wireless transceivers to camp on a cell on the selected first frequency band; and
assign the selected second frequency band to one of the wireless transceivers, thereby enabling one of the wireless transceivers to connect to one of the non-cellular networks on the selected second frequency band.

2. The wireless communication device of claim 1, wherein, after camping on a cell on the selected first frequency band, one of the wireless transceivers sends a measurement report indicating that only the selected first frequency band is available to the cell on the selected first frequency band.

3. The wireless communication device of claim 2, wherein the measurement report is sent periodically.

4. The wireless communication device of claim 1, wherein, after connecting to one of the non-cellular networks on the selected second frequency band, one of the wireless transceivers measures signal quality of only the non-cellular networks on the selected second frequency band.

5. The wireless communication device of claim 1, wherein the cellular networks are New Radio (NR) networks or Long Term Evolution (LTE) networks, and the non-cellular networks are Wireless-Fidelity (Wi-Fi) networks.

6. A wireless communication device, comprising:
one or more wireless transceivers, configured to detect one or more first frequency bands of one or more cellular networks according to measurement configuration received from one of the cellular networks, and detect one or more second frequency bands of one or more non-cellular networks; and a controller, configured to:

determine whether there is at least one combination of one of the first frequency bands and one of the second frequency bands, wherein the first frequency band and the second frequency band in the combination do not overlap; and enable one of the wireless transceivers to send a first measurement report indicating that only the first frequency band in the combination is available to the one of the cellular networks, when there is the combination.

7. The wireless communication device of claim 6, wherein the controller is further configured to:

enable one of the wireless transceivers to send a second measurement report indicating that the first frequency bands are available to the one of the cellular networks, when there is not the combination; and after one of the wireless transceivers receives a handover command indicating a handover to one of the first frequency bands, enable one of the wireless transceivers to connect to one of the non-cellular networks not on the first frequency band indicated by the handover command.

8. The wireless communication device of claim 6, wherein the controller is further configured to:

determine whether a non-cellular throughput is prioritized over a cellular throughput, when there is not the combination; and enable one of the wireless transceivers to refrain from sending a second measurement report indicating that the first frequency bands are available to the one of the cellular networks, when the non-cellular throughput is prioritized over the cellular throughput.

9. The wireless communication device of claim 8, wherein the controller is further configured to:

estimate whether the cellular throughput is going to increase with an additional connection to be established on one of the first frequency bands, when the non-cellular throughput is not prioritized over the cellular throughput;

enable one of the wireless transceivers to send the second measurement report to the one of the cellular networks, when the cellular throughput is going to increase with an additional connection to be established on one of the first frequency bands; and wherein the enabling of one of the wireless transceivers to refrain from sending the second measurement report is performed when the cellular throughput is not going to increase with an additional connection to be established on one of the first frequency bands.

10. The wireless communication device of claim 6, wherein the measurement configuration is received in an RRC (Radio Resource Control) Connection Reconfiguration message which is in compliance with 3rd Generation Partnership Project (3GPP) specifications for an NR technology or an LTE technology.

11. The wireless communication device of claim 6, wherein the cellular networks are NR networks or LTE networks, and the non-cellular networks are Wi-Fi networks.

12. A wireless communication device, comprising:

one or more wireless transceivers, configured to receive radio bearer configuration indicating a first frequency band of a first cellular network utilizing a first Radio Access Technology (RAT) from a second cellular network utilizing a second RAT, and detect one or more second frequency bands of one or more non-cellular networks; and a controller, configured to:

determine whether there is at least one combination of the first frequency band and one of the second frequency bands, wherein the first frequency band and the second frequency band in the combination do not overlap; and enable one of the wireless transceivers to send a message to the second cellular network to indicate a failure to establish a connection on the first frequency band, when there is not the combination.

13. The wireless communication device of claim 12, wherein the enabling of one of the wireless transceivers to send the message is performed when there is no ongoing call using the first RAT associated with any one of the wireless transceivers.

14. The wireless communication device of claim 12, wherein the controller is further configured to:

enable one of the wireless transceivers to establish the connection on the first frequency band, when there is the combination.

15. The wireless communication device of claim 12, wherein the controller is further configured to:

when there is the combination and the second frequency band in the combination is not the second frequency band on which one of the wireless transceivers is currently connected to one of the non-cellular networks, assign the second frequency band in the combination to one of the wireless transceivers, thereby enabling one of the wireless transceivers to connect to one of the non-cellular networks on the second frequency band in the combination.

16. The wireless communication device of claim 12, wherein the controller is further configured to:

determine whether a non-cellular throughput is prioritized over a cellular throughput, when there is not the combination;

wherein the enabling of one of the wireless transceivers to send the message is performed when the non-cellular throughput is prioritized over the cellular throughput.

17. The wireless communication device of claim 16, wherein the controller is further configured to:

estimate whether the cellular throughput is going to increase with the connection to be established on the first frequency band, when the non-cellular throughput is not prioritized over the cellular throughput;

enable one of the wireless transceivers to establish the connection according on the first frequency band, when the cellular throughput is going to increase with the connection to be established on the first frequency band; and wherein the enabling of one of the wireless transceivers to send the message is performed when the cellular throughput is not going to increase with the connection to be established on the first frequency band.

18. The wireless communication device of claim 12, wherein the message is an SCG (Secondary Cell Group) Failure Information message in compliance with 3GPP specifications for an LTE technology.

19. The wireless communication device of claim 12, wherein the radio bearer configuration is received in an RRC Connection Reconfiguration message in compliance with 3GPP specifications for an LTE technology.

20. The wireless communication device of claim 12, wherein the first RAT and the second RAT are an NR technology and an LTE technology, respectively, and the non-cellular networks are Wi-Fi networks.

\* \* \* \* \*